United States Patent [19]
Cloninger

[11] Patent Number: 5,615,850
[45] Date of Patent: Apr. 1, 1997

[54] WIRE SUPPORT BRACKET

[76] Inventor: Leonard W. Cloninger, 2131 Spokane Creek Rd., East Helena, Mont. 59635

[21] Appl. No.: 398,696

[22] Filed: Mar. 6, 1995

[51] Int. Cl.⁶ ...................................................... F16L 3/22
[52] U.S. Cl. ............................ 248/68.1; 248/909; 211/26
[58] Field of Search ........................... 248/68.1, 65, 49, 248/909; 211/26

[56] References Cited

U.S. PATENT DOCUMENTS

| | | | |
|---|---|---|---|
| D. 293,203 | 12/1987 | Hertensteiner | D8/354 |
| 934,463 | 9/1909 | Ritter . | |
| 2,419,675 | 4/1947 | Carpenter | 248/68.1 |
| 2,543,997 | 3/1951 | Vavra et al. | 248/68.1 |
| 2,661,483 | 12/1953 | Tortorice . | |
| 2,889,016 | 6/1959 | Warren . | |
| 3,022,030 | 2/1962 | Geer | 248/58 |
| 3,690,609 | 9/1972 | Montesdioca | 248/68.1 |
| 4,079,838 | 3/1978 | Granum | 248/909 |
| 4,283,034 | 8/1981 | Sheehan | 248/909 |
| 5,060,892 | 10/1991 | Dougherty | 248/57 |
| 5,375,726 | 12/1994 | Lechleiter | 248/68.1 |

FOREIGN PATENT DOCUMENTS

| | | | |
|---|---|---|---|
| 2715394 | 10/1978 | Germany . | |
| 1580213 | 11/1980 | United Kingdom | 248/68.1 |

*Primary Examiner*—Karen J. Chotkowski
*Assistant Examiner*—Anita M. King
*Attorney, Agent, or Firm*—Richard C. Conover

[57] ABSTRACT

An improved wire bracket for use in construction which can be used to hold and organize electrical wires within holes located in the bracket. The bracket has two separable portions with a breakaway line separating the two portions, each of the individual portions having holes formed therein through which wire is threaded. The bracket further having reinforced mounting flanges or plates oriented on each of the three axes of the bracket to provide flexibility in mounting the bracket on different construction members.

5 Claims, 2 Drawing Sheets

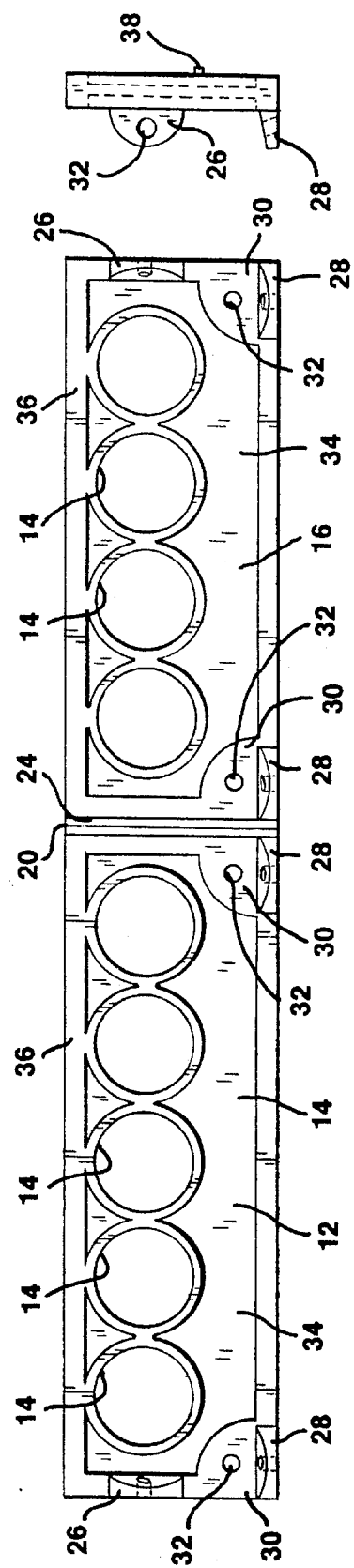
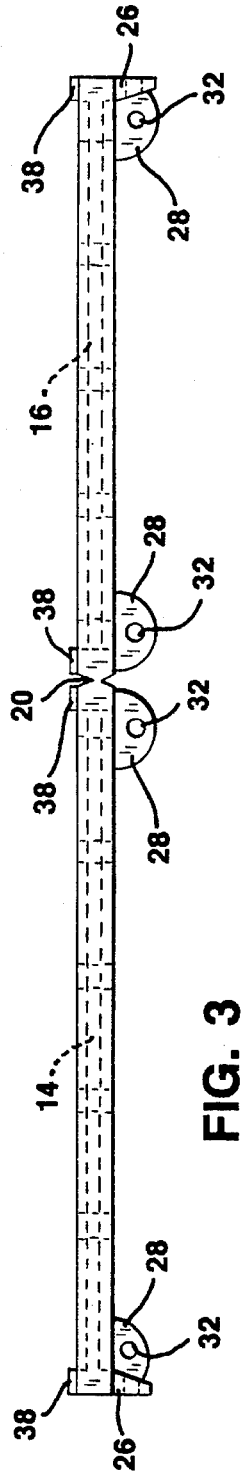
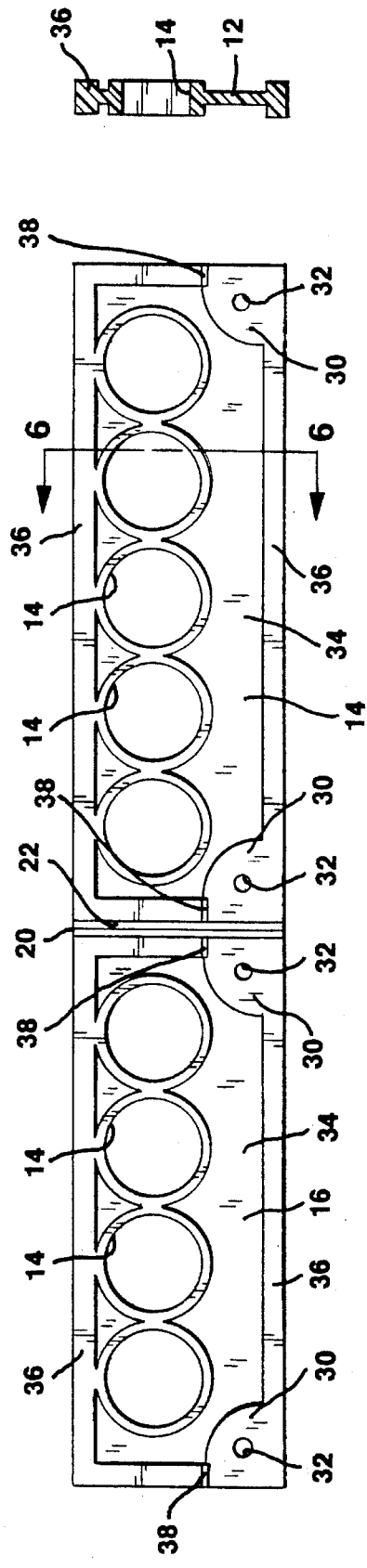
FIG. 2
FIG. 3
FIG. 4
FIG. 5
FIG. 6

WIRE SUPPORT BRACKET

BACKGROUND OF THE INVENTION

This invention relates to an improved bracket for holding electrical wire on ceilings, floors, and other construction members.

As buildings are constructed, electrical wiring is run from a circuit breaker panel out to the various outlets, switches, and equipment being used in the building. In the past, wiring cable has often been stapled to building members such as floor joists, vertical studs, or ceiling joists or rafters. Bundles of wire so stapled often become very confusing making it hard to trace individual circuits, or to present a clean, professional look to the finished job when many of the runs are just a mass of individual wires.

In addition, the National Electrical Code (NEC) requires that if wires are stapled to a piece of wood, such as a floor joist, the thickness of the wood has to be at least 1 and ¼ inches to preclude someone from nailing through the wood and hitting a wire stapled on the opposite side of the wood. When sawed beams were used for floor joists, the beam width usually exceeded these specifications, but with the advent of the prefabricated, wooden "I" beams, used for floor joists and the like, wire stapled on one side of the "I" beam is only about a ½ inch away from the opposite side of the "I" beam. Nailing or screwing through such an "I" beam and striking a wire stapled to the other side could cause a serious electrical shock or cause a fire to start. A need exists for a bracket which can be mounted to the web of a wooden "I" beam to hold electrical wire at least the spacing required by the Electrical Code, from the opposite side of the web.

Also during construction, available space for running wires is greatly reduced as other crafts such as plumbing, heating, ventilation, sprinkler piping, and vacuum systems run their materials in the same joist cavity. Thus, a need arises for a bracket to organize wiring to effectively utilize the space in such cavity.

Furthermore a need exists for individual brackets which are designed to be smoothly broken into separate sections along a breakaway line so that an installing electrician need not carry a great many different sizes of wire brackets. The sections broken away should have the appropriate dimensions to fit different sizes of prefabricated "I" beams as well as having the appropriate flanges or plates to permit installing them with different orientations on the various building members.

Further, a need exists for a bracket having indexing fingers which would enable an installing electrician to properly position a bracket on top of a ceiling joist used in roof trusses.

In the early days of running electrical wires in buildings, a bracket, having a longitudinal series of holes, was used to separate the individual wires—see U.S. Pat. No. 934,463 to Ritter. These brackets, which were positioned adjacent to a ceiling, were mounted using screws positioned at right angles to the wires running through the bracket. The brackets in this patent had no flexibility to be mounted along any of the other axes, or to be broken into smaller portions.

U.S. Pat. No. 3,022,030 to Geer illustrates another bracket that can be mounted between joists, but this bracket uses open-mouth hangers to hold wire. Open mouth hangers do not provide a positive method for stringing wire where the wire will remain in the position so strung.

Other patents, such as U.S. Pat. No. 2,419,675 to Carpenter, and U.S. Pat. No. 5,060,892 to Dougherty illustrate other hangers, but these hangers mount in only one position where the hanger is essentially horizontal.

From the above, it can be seen that a considerable improvement can be brought to the electrical wiring trades if a bracket can be made which can be secured to construction members in any one of three axes of the bracket (length, width, or depth). The bracket should have holes to run wire through so that, once installed, the wire can not be easily moved. In addition, the bracket should be capable of being broken into smaller portions to provide on-site flexibility for an electrician to fit the brackets to appropriate construction members along the entire run of the wire. Further, this bracket should have indexing fingers to enable an installer to properly install the bracket on top of joists such as ceiling joists.

SUMMARY OF INVENTION

The present invention relates to an improved wire bracket which can be used to hold wires neatly, and securely, within holes located in the bracket.

The bracket is a one-piece object that is shaped to provide the desired characteristics. The bracket, which has two separable portions, has a series of holes extending along the longest axis (the length) of each portion. The holes in both portions serve to hold wire threaded through the holes. A breakaway line separates the two portions to provide an easy way for an electrician to break the bracket into two smaller individual portions so that each can be used independently. Each of the individual portions has mounting flanges or plates oriented on each of the three axes of the bracket (length, width, and depth) to provide the flexibility to mount the bracket on any of a number of individual construction members in a way that can keep the electrical wires neat, orderly, and secure from movement into another wire's run. The holes are also spaced apart from one edge so that if the edge is placed against a wooden "I" beam, the wires can remain at least the Electrical Code required spacing away from the opposite side of the "I" beam. Further, the bracket is provided with indexing fingers to enable an installer to properly install the bracket on top of joists such as ceiling joists.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 2 is an elevational view of the invention shown in FIG. 1;

FIG. 3 is a plan view of the invention shown in FIG. 2;

FIG. 4 is a right side view of the invention shown in FIG. 2.

FIG. 5 is a back view of the invention on a side opposite the view shown in FIG. 2;

FIG. 6 is a cross-sectional view of the invention with background parts broken away taken along the line A—A in FIG. 5.

DESCRIPTION OF A PREFERRED EMBODIMENT

Figure 1:
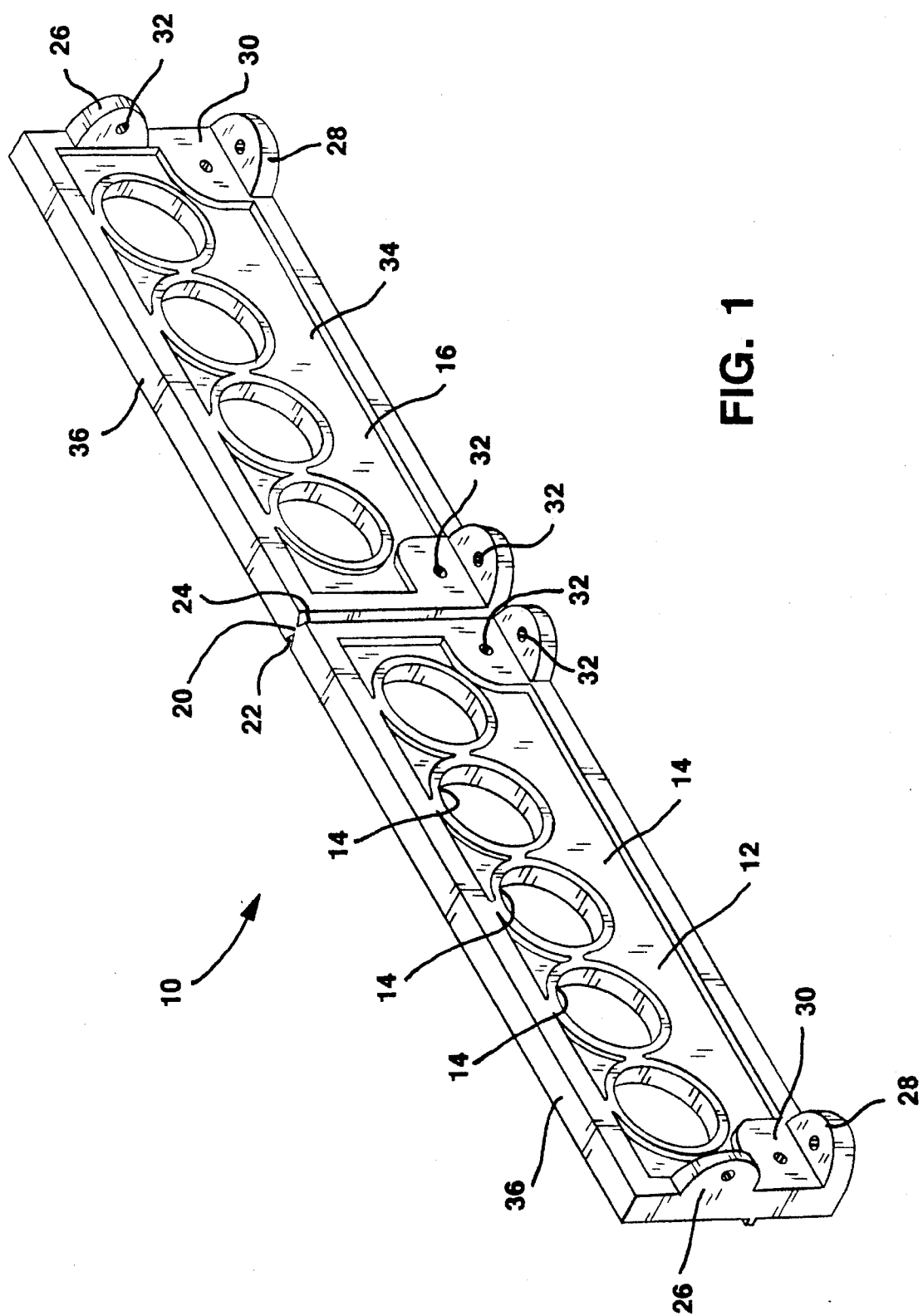
FIG. 1 is perspective view of the present invention.

A preferred embodiment of the wire bracket 10 is shown in FIG. 1. Wire bracket 10 has a single body 12 which has a series of longitudinal holes 14 spaced along the length of the body. Holes 14 are used to hold wires that can be threaded through any individual hole. Body 12 has a first portion 14 and a second portion 16 separated by a breakaway line 20, which portions are usually, but not necessarily, of unequal size. Breakaway line 20 is formed as a narrow solid piece of body 12 located between grooves 22 and 24. The narrow piece of body 12 can be easily broken by an operator by flexing first portion 14 toward second portion 16 so that two smaller brackets can then be individually available for use.

Body 12 also has reinforced, side flanges 26, bottom flanges 28, and embedded plates 30 formed on the body perpendicular to one of the three axes of body 12 (oriented along the length, width, and depth of the body). Side flanges 26, bottom flanges 28, and embedded plates 30 each have a screw hole 32 for a fastener, for instance a screw or a nail, passing through the respective flange or plate so that wire bracket 10 can be fastened to an appropriate construction member.

In addition, body 12 has a thin, extended surface 34 extending between the edge with the bottom flanges 28 and the holes 14 which surface keeps any wires threaded through the holes away from the above identified edge an appropriate distance to meet specific NEC code requirements for spacing distances. Thin, extended surface 34 lies between edge flanges 36, which are thicker in depth, located both front and back as seen in FIG. 6, to provide strength to wire bracket 10. Indexing fingers 38, best seen in FIGS. 3 and 4, are used to properly install the bracket 10 on top of a construction member such as a ceiling joint by positioning the bracket 10 with the indexing fingers abutting the top of the construction member.

In operation, wire bracket 10 may be broken into first portion 16 and second portion 18 if a smaller wire bracket is needed. Used as a whole or broken in two, the bracket(s) is placed against the appropriate construction member and screws are driven through the screw holes in the appropriate flange or plate. If bracket 10 is to be mounted on top of a construction member indexing fingers 38 are positioned on top and against the construction member to properly position the bracket 10 for attachment to the construction member. Electrical wire is then threaded through one of the holes in each of the wire brackets installed on an electrical wire run.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A wire bracket, to be fastened to a construction member, for holding and organizing electrical wire comprising;

an elongated body having a length, width, and depth axis;

the elongated body having a first portion and a second portion separated by a breakaway line;

the elongated body further having a plurality of holes extending through the depth of the elongated body and spaced along the length of the elongated body in both the first and second portions through which holes the electrical wire is to be threaded;

a plurality of reinforced fastener accepting means, positioned parallel to each of the three axes, for use in fastening the wire bracket to the construction member; and indexing fingers extending outwardly from the body for indexing the bracket on a construction member.

2. The wire bracket according to claim 1 wherein the reinforced fastener accepting means along the length and width axes includes a flange with a screw hole extending through the flange.

3. The wire bracket according to claim 1 wherein the reinforced fastener accepting means along the depth axis includes an embedded plate with a screw hole extending through the embedded plate.

4. The wire bracket according to claim 1 wherein the holes of the body are circular.

5. The wire bracket according to claim 1 wherein the construction member comprises a wooden "I" beam having a web and the bracket is sized to space wires extending through the holes a predetermined distance from a side of the web opposite the side on which the bracket is mounted.

\* \* \* \* \*